Figure 1:
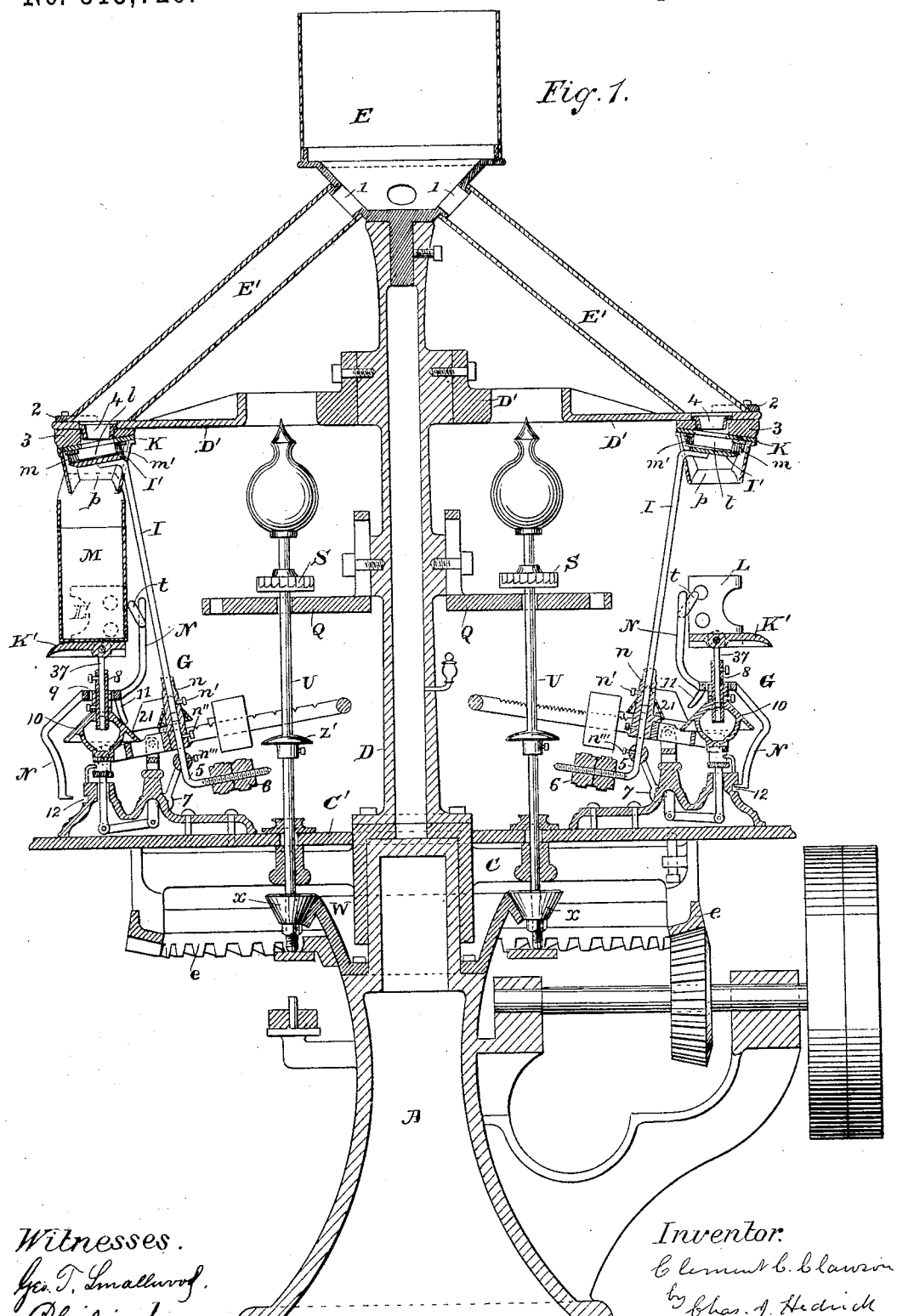

(No Model.) 2 Sheets—Sheet 1.
C. C. CLAWSON.
AUTOMATIC WEIGHING AND PACKAGE FILLING MACHINE.
No. 315,729. Patented Apr. 14, 1885.

Witnesses.
Geo. T. Smallwood.
Philip Mauro

Inventor:
Clement C. Clawson
by Chas. J. Hedrick
his attorney (No Model.) 2 Sheets—Sheet 2.
C. C. CLAWSON.
AUTOMATIC WEIGHING AND PACKAGE FILLING MACHINE.
No. 315,729. Patented Apr. 14, 1885.
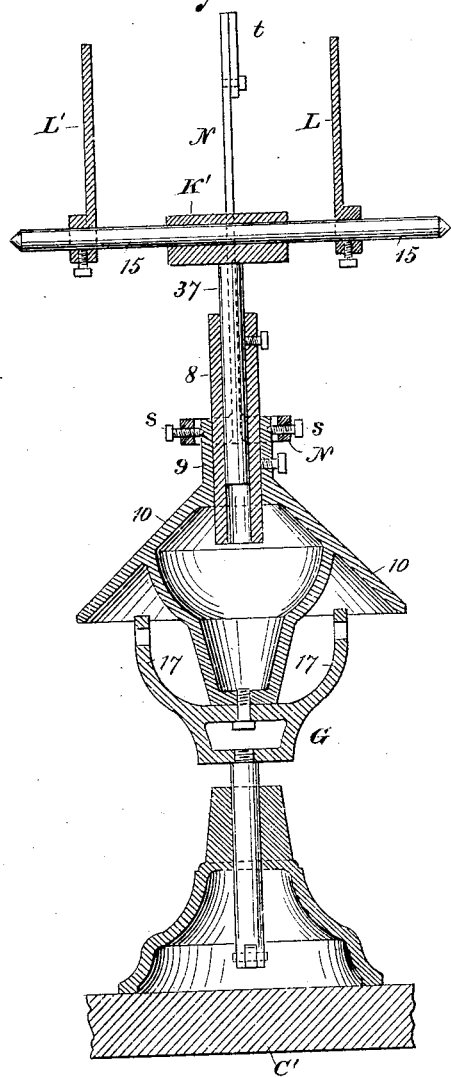
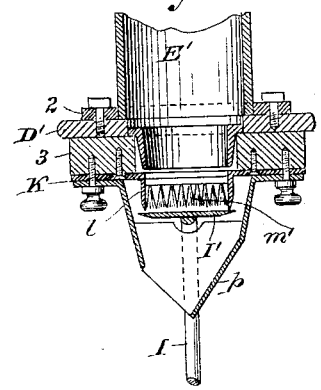
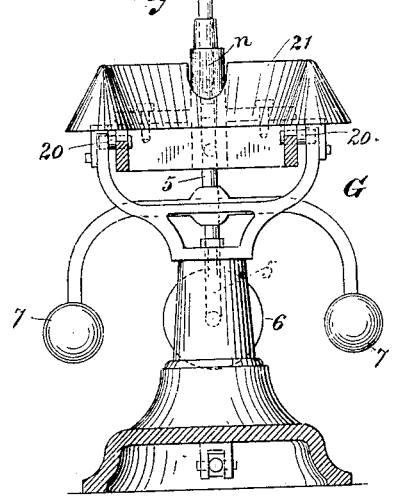
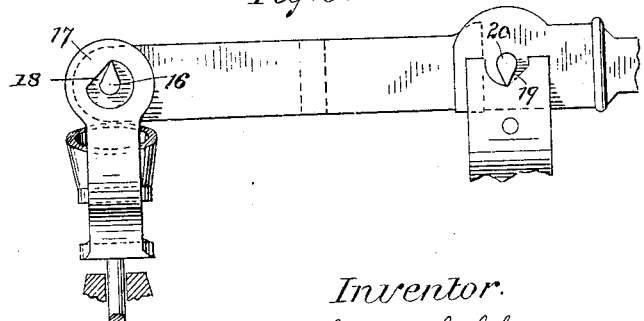
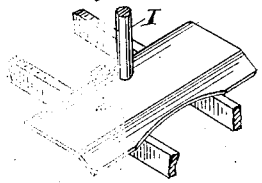
Witnesses.
Geo. T. Smallwood
Philip Mauro
Inventor.
Clement C. Clawson
by Chas. J. Hedrick
his attorney

United States Patent Office.

CLEMENT C. CLAWSON, OF NEWARK, NEW JERSEY, ASSIGNOR OF ONE-HALF TO THURBER, WHYLAND & CO., OF NEW YORK, N. Y.

AUTOMATIC WEIGHING AND PACKAGE-FILLING MACHINE.

SPECIFICATION forming part of Letters Patent No. 315,729, dated April 14, 1885.

Application filed November 12, 1884. (No model.)

*To all whom it may concern:*

Be it known that I, CLEMENT C. CLAWSON, a citizen of the United States, and a resident of Newark, Essex county, State of New Jersey, (formerly of Raleigh, North Carolina,) have invented certain new and useful Improvements in Automatic Weighing and Package-Filling Machines, of which the following specification is a full, clear, and exact description.

This invention has reference more particularly to machines for filling packages or cartons of card-board, paper, and other material with equal weights of granular substances—such as bird-seed, hominy, oatmeal, coffee, and the like—but is applicable in whole or in part to the weighing or filling of packages with other substances. It is mainly designed as a modification of and improvement upon the machine of my invention described in Letters Patent of the United States No. 266,951, granted October 31, 1882, although the present improvements or some of them might be applicable to other machines. In the patented machine a number (four) of weighing-scales are carried by a revolving table. The pan or plate of each scale is adapted to receive and support a carton or package. A hopper is supported above the scales and revolves with the table. It has a series of openings, one over each scale-pan or scale-plate, so that the material in the hopper may flow through the opening into the carton or package on the scale pan or plate. At each delivery-opening there is a gate controlled by the corresponding weighing-scale, so that when the pan or plate thereof is depressed the gate is advanced to close the opening and cut off the delivery of material to the package, and when the scale-pan or scale-plate is raised the gate is withdrawn to uncover the opening and allow the delivery to recommence. A latch is provided for holding down the scale-pan that it may not rise and uncover the delivery-opening when relieved of the weight of a full carton or package until a new one is placed on the scale-pan. This latch is arranged to be operated automatically by contact with the package. There are also sliding spindles, one for each weighing-scale, which support the scale-beam with the scale-pan depressed and supply-gate closed during the removal of a full package and the insertion of an empty one. Tapping apparatus (one for each weighing-scale) are provided for tapping the packages on the scale-pan, when desired. They are operated from the aforesaid spindles, which are revolved by contact with a friction-wheel. In the said patent it is also pointed out that a single weighing-scale that does not rotate can be used in connection with a suitable hopper where a small machine is desired.

The object of the present invention is mainly to secure greater accuracy in the weighing by an ordinary supervision, although other objects are the simplification of the machine and the adapting it to fill different-sized packages.

First. It is found that a flat scale-pan retains material which accidentally escapes in small quantities until at length sufficient is collected to make an appreciable difference in the weighing. To remedy this difficulty the horizontal area of the package-support is made small, or not materially larger than the bottom of the package or carton which rests thereon, and below this support is a conical skirt which extends over the bearings of the scale-pan below. If any of the substance being weighed escape, it falls upon the skirt and does not adhere except in very small quantities. The skirt also by delivering it outside prevents its lodging upon the scale-beam.

Second. In order that the scale may be the better adapted to filling different-sized packages, the package-support is made vertically adjustable, so that it may be brought nearer to or removed farther from the delivery opening or spout.

Third. The gage-plates for upholding the package in filling are mounted upon rods projecting laterally from the package-support, and are made adjustable thereon.

Fourth. The latch for holding down the scale-pan is provided with an adjustable contact-finger, to be struck by the package when inserted. The object of the adjustment is the better to accommodate different-sized packages.

Fifth. The latch is provided with a stop to limit the outward movement or movements of the same when the package is inserted.

Sixth. The latch, instead of being wholly behind the scale-pan, as heretofore, is placed partly in front and partly behind, the pivot being about on the middle line of the scale-pan.

Seventh. The weighing-scale is provided, in addition to the ordinary adjustable weights, with a supplemental weight in the form of a nut adjustable on a screw-rod. Weight-nuts have heretofore been used in the ordinary platform-scales; but the particular construction and arrangement (hereinafter fully set forth) whereby nut-weights are applied to small automatic scales is believed to be new.

Eighth. In order to render the scales independent of the centrifugal force developed by the rotation of the revolving table, balance-weights are connected with the scale-beams on the opposite side of the fulcrum from the gate which controls the supply. The weight-nut before described is or may be arranged to act as a centrifugal balance-weight. When the power is steady, it is not necessary to use the centrifugal weights, as the centrifugal force being constant it can easily be compensated for.

Ninth. The scale-bearings at the base of the rod which supports the supply-gate are protected by a shield, which prevents the material weighed from lodging thereon or therein.

Tenth. To prevent the movable parts of the scale from rebounding when the scale-pan descends with its load, which rebounding would be apt partly to open the supply-gate and thus deliver an overweight into the package, the brush at the front of the delivery-opening is arranged to make contact with the supply-gate, so as to give a slight friction sufficient to prevent a rebound of the moving parts of the scale. The brush thus acts as friction device, which comes into play at the end of the supply-gate's movement.

Eleventh. It is found desirable with some substances, in order to prevent the gate from wedging, to use a brush at the back as well as at the front of the delivery-opening. This is not broadly new in automatic weighing-scales, and is only claimed herein in combination with the supply-gate carried by a rod fixed at the lower end in the scale-beam.

Twelfth. The delivery-openings are provided with removable bushings of frusto-conical form, this form being found in practice to be better than the flat or plate bushing of the aforesaid patent.

Thirteenth. A hopper centrally placed over the axis of the revolving table, and provided with chutes radiating therefrom and descending toward the weighing-scales, is found for substances of a ready flowing or granular nature to be a more convenient form than the annular hopper of the patent. The delivery-openings are at the outer or lower ends of the chutes.

Fourteenth. To prevent the scale-pan and scale-beam from sliding over their bearings, which they are apt to do when the knife-edges enter the ordinary circular openings in the supporting-arms, the edges of said openings are inclined at such an angle that they will not ride upon the knife-edges, nor the knife-edges upon them.

Having thus explained the nature or principle of the present invention, what is considered the best mode of applying the same will now be described with the aid of the accompanying drawings, which make part of this specification.

Figure 1 is a central vertical section of a machine constructed in accordance with the invention, and Figs. 2 to 6 detail views.

A is the base of the machine, hereinafter called the "pedestal;" C, a frame supported and turning upon the top of the pedestal; C', a marble top or rotary table that is supported by and turns with the frame C. D is a column bolted at the foot to the revolving frame C; E, a hopper mounted on the upper end of the column D; E', the chutes descending obliquely from the hopper, and G a series of automatic weighing-scales carried by the rotary table C'.

The chutes E' consist each of a cylindrical tube which is upheld by an arm, D', bolted to the column D, and also by a boss, 1, on the hopper. The upper end of the chute fits over the boss 1, and the lower beveled end rests upon the top of the arm D'. A curved piece, 2, fitting around the front of the chute and screwed to the arm D', prevents the chute from sliding forward or moving sidewise at the bottom. The delivery-openings are made through the end of the arms D', and also through the wedge-shaped blocks 3, fixed to the under side of the arms. The frusto-conical bushing 4 fits in the opening and is supported by a flange at the top. The bushing can be removed and replaced by one with a larger or smaller bore by detaching the holding-piece 2 and removing the chute E'. The mouth-pieces K are secured fast to the inclined bottom of the block 3. There are brushes $m\ m'$, respectively at front and back of each delivering-opening, and at the sides thereof the depending plates $l$. The bristles of the front brush preferably extend slightly below the lower edges of these plates in order to make contact with supply-gate I' when it is moved forward. It thus acts as a friction-pad to prevent the scale rebounding. The edges of the gate I' and also of the plates $l$ are beveled. Under the mouth-piece K is the small spout $p$. The gate I' is fastened at the upper end of the arm I, whose lower end fits in a socket-piece, $n$, in the scale-beam just behind the fulcrum. A set-screw, $n'$, retains the arm in place while allowing its adjustment. In the same socket-piece $n$ fits the bent rod 5, which is held in place by the set-screw $n''$. It is screw-threaded at the outer end and carries the nut-weights 6, and also the centrifugal balance-weights 7. The latter are adjustable on the vertical part of the rod, being held by a set-screw, $n'''$, and the former on the horizontal threaded part. The weights are adjusted so that their centrifugal force due to the rotation of the weighing-scales with table C balances that of the arm I and gate I'. The nut-weights are adjusted to give precisely the balance desired in weighing. Each weighing-scale has a package-support, K', with gage-plates L L' on either side. The gage-plates are supported by and are adjustable on the rods 15, that project from the sides of the package-support. The package-support is mounted on a vertically-sliding carrier, 37. In the drawings the carrier slides in the sleeve 8, which itself is adjustable vertically in the collar 9 of the scale-pan. It may, however, slide directly in the socket in the scale-pan. The former construction is preferable where a very large vertical adjustment is desired. Set-screws retain the parts in the position to which they may be adjusted. The scale-pan is provided with the conical skirt 10, which extends over the bearings or knife-edges 16, by which the scale-pan is supported on the beam. Any material which may fall past the package does not collect on the scale-pan but slides off and is delivered clear of the bearings. The knife-edges 16 are fixed in the scale-beam and project in the arms 17, which support the scale-pan. The front edges 18 of these openings are straight, (see Fig. 5,) and present a steep inclination to the knife-edge, so that if pressure (in placing the package on the scale-pan, for example) be applied, tending to force back the scale-pan the pressure will be resisted, or if the supporting-arms ride on the knife-edges they will return to their former position so soon as the pressure is withdrawn. With the same object the edge 19 of the openings in the supporting-arms on which the knife-edges 20 rest are similarly inclined. At the base of the arm I is a shield, 21, which surrounds the arm and extends over the adjacent part of the scale-beam and also over the fulcrum. It is made with sharply-inclined sides, as shown in Fig. 1, for most materials; but where grains, such as bird-seed, are to be weighed a flat form of shield may be adopted, as shown in Fig. 6. The latch N is pivoted at $s$ to the collar 9, which it surrounds. The upper part of the latch lies at the back of the scale and is provided with an adjustable contact-finger, $t$, which is struck by the package when the latter is placed on the package-support. The lower part of the latch which engages the notch 12 in the scale-frame is at the front of the scale. Stop 11 limits the movement of the latch and thus prevents the package from being moved too far back on the package-support. The gear $e$ for rotating the table C' is made in one piece or casting with the frame C. The spindles U slide and turn in bearings in the frame C and in the brackets Q. They are revolved by the friction-wheel W, bolted to the pedestal A and the bevel friction-pinions $x$ on the spindles. A stationary cam raises and lowers the spindles U at the proper time, as in the aforesaid patent. The lifting device $z'$ on each spindle U projects under the corresponding scale-beam. Each spindle U carries a ratchet-wheel, S, for operating tapping arms, as described in the aforesaid patent. These tapping arms need not be used if not desired.

The operating of the machine is as follows: The scales being all latched down so that all the gates I' are closed, and the proper bushings 4 being placed and secured in the recesses therefor, and the package-support K' and the gage-plates L L' and contact-finger $t$ being properly adjusted for the packages to be filled, the scale-weights being adjusted on the beam and the nut-weights on the screw-rod, the hopper E is filled to the proper depth with the material to be weighed and packed, and the machine is started. The table C' being revolved the scales are successively made to pass the attendant, who is stationed in front of the machine. As they come opposite him, he places a carton or empty package, M, between the gage-plates L L' until stopped by the contact of stop 11 with skirt 10. He is careful to place the side of the carton which has no flap adjacent to the gage-plate L. This makes the opposite side, which has the longest flap, face the mouth of the spout $p$. This mouth has been made at one side in order to deliver the material away from the open or flapless side. The carton or package as it is inserted strikes and pushes back the contact-piece $t$, vibrating the latch N and releasing it from the notch 12. The scale-pan with its carton or package does not, however, rise immediately, because the spindle U is still raised by the cam, and the device $z'$ upholds the scale-beam, keeping the gate I' closed. As the spindle U is gradually allowed to descend, the gate I' opens and allows the material to descend through the spout $p$ into the carton or package. The descent of the spindle U brings the pinion $x$ into contact with the friction-gear W, and the said spindle and the ratchet-wheel S commence to revolve. If the tapping arms (not shown) are in action, they are vibrated by the wheel S and tap on the sides of the carton, so as to shake down the material delivered thereinto. As soon as the proper quantity of material has passed into the carton or package, the scale-pan is depressed, tilting forward the arm I and gate I', and stopping the delivery of material. After the delivery ceases, the spindle U is again raised by the cam, when the full package is removed and a fresh one put in its place. As soon as the full package is removed, the latch N immediately drops into engagement with the notch 12, and if the attendant should neglect to insert an empty carton, it would continue to hold down the scale and keep closed the gate, as shown at the right of Fig. 1, until released by the insertion of a fresh carton or package. Should the attendant not remove a full package, its weight would of course keep the gate I' closed.

Modifications may be made in the details of construction without departing from the spirit of my invention, and portions of the invention may be used separately. For example, the weighing-scales could be used with different styles of hopper; also, the means for rotating the scale-table C', the spindle U, and cam being omitted, the four weighing-scales could still be operated, it only being necessary to supply empty packages and remove full ones. One attendant in that case could not, however, supply the four scales. One of the weighing-scales could be provided with its own hopper and be used as a complete small machine, its capacity being, of course, much less than that of the machine shown.

I claim the new improvements herein described, all and several, to wit:

1. The combination, with a spout or hopper, and a gate for controlling the delivery of material therefrom, of a weighing-scale supplied from said spout or hopper, and provided with a conical skirt extending at the bottom over the end of the scale-beam or bearings of the scale-pan, substantially as described.

2. In a weighing-scale, the scale-pan provided with a package-support, and a conical skirt below the same which extends at the bottom over the end of the scale-beam or bearings of the scale-pan, substantially as described.

3. In a weighing-scale, the package-support mounted on a carrier adjustable vertically in an underlying part of the scale-pan, substantially as described.

4. The scale-pan provided with the conical skirt, and also with the vertically-adjustable package-support arranged above the apex of the cone, substantially as described.

5. The combination, with the weighing-scale, the supply-gate, and its supporting-arm, of the shield at the base of said arm extending over the fulcrum of the scale, substantially as described.

6. The combination, with the package-support of a weighing-scale, of the gage-plates, adjustably mounted upon rods projecting from the sides of said support, substantially as described.

7. In a weighing-scale, and in combination with the scale-pan adapted to support a box or package, the retaining-latch provided with the adjustable contact-finger to be struck by the package, substantially as described.

8. The combination, with the scale-pan adapted to support a carton or package, of the retaining-latch to be released by insertion of a package, and the stop for limiting the movement of said latch, and through it of said package, substantially as described.

9. The scale-pan of a weighing-scale provided with a retaining-latch having the part to be struck by the package at the back of said scale-pan, and the part for engaging the notch or stationary catch at the front of the same and pivoted thereto at an intermediate point, substantially as described.

10. The combination, with the scale-pan having the conical skirt and the vertically-adjustable package-support, of the latch pivoted to the collar at the top of the skirt, substantially as described.

11. The combination, with a weighing-scale having the scale-pan at the front end of the beam, of one or more weight-nuts arranged behind the fulcrum and supported under the beam by the bent screw-rod attached at the upper end to the said beam, substantially as described.

12. The combination, with a weighing-scale and a supply-gate connected therewith, so as to be operated by the movement of said scale, of one or more nut-weights additional to the usual scale-weights and adjustable on a screw-rod attached to the beam of said scale, substantially as described.

13. The weighing-scale having its beam supported on knife-edges which project into openings having each a steep inclination to the point where the apex of the knife-edge rests, in combination with a supporting-arm carried by the said beam, to which said arm is fastened at its lower end, and a supply-gate fixed to the upper end of said arm, substantially as described.

14. The combination of a scale-pan provided with a package-support having plates for holding the package upright thereon, the scale-beam, and a scale-frame, the scale-pan and scale-beam resting upon knife-edges, and the openings into which one or both pair of knife-edges enter having edges of steep inclination to prevent the scale-pan or scale-beam from riding on the knife-edges in inserting the packages, substantially as described.

15. The combination, with a weighing-scale carried by a rotary table, and the supply-gate connected with and operated by said scale, of the centrifugal balance-weight arranged in the opposite side of the fulcrum from said gate, substantially as described.

16. The combination, with an automatic weighing-scale comprising a supply-gate connected with and operated by the scale, of a friction device arranged to come into action at the end of the supply-gate's forward movement for preventing the rebound of the scale in closing the gate, substantially as described.

17. The combination, with a weighing-scale, a hopper, and a mouth-piece provided with a brush at the front thereof, of the supply-gate arranged to work out of contact with the other sides of the mouth-piece, but to make contact with the brush, so that the latter acts as a friction-pad to prevent rebounding of the scale, said supply-gate being attached to and carried by the upper end of a supporting-arm fixed at the lower end in the beam of said scale, substantially as described.

18. The combination, with the weighing-scale and supply-gate carried by an arm attached to said scale, of the mouth piece or hopper provided with brushes at both front and back of the delivery-opening, and with metallic plates at the sides thereof, substantially as described.

19. The combination, with the hopper, the weighing-scale, and the supply-gate, of the frusto-conical bushing removably supported in the delivery-opening between the gate and the body of said hopper, substantially as described.

20. The combination, with a series of weighing-scales carried on a rotating table, of a centrally-arranged hopper provided with a series of inclined chutes for delivering the material from the said hopper into the said scales, substantially as described.

21. In a package-filling machine, the combination, with a hopper, of a series of tubes extending from the bottom of said hopper, each tube at its upper end fitting over a boss on the hopper, substantially as described.

22. The herein-described automatic weighing and package-filling machine comprising in combination the following elements: a rotary table, the scales, the supply-gate, and supportig-arm to each scale, the centrally-arranged hopper, the series of inclined chutes, and the mouth-pieces, and removable bushings of frusto-conical form at the lower ends of the chutes, as set forth.

In testimony that I claim the foregoing as my invention I have signed my name to this specification, in presence of two witnesses, this 29th day of October, 1884.

CLEMENT C. CLAWSON.

Witnesses:
GEO. W. WILKINS,
C. J. HEDRICK.